(12) United States Patent
Chen et al.

(10) Patent No.: US 9,751,378 B2
(45) Date of Patent: Sep. 5, 2017

(54) AIR CONDITIONING SYSTEM AND HEAT EXCHANGER

(71) Applicant: Hangzhou Sanhua Research Institute Co., Ltd., Zhejiang (CN)

(72) Inventors: Shaolong Chen, Zhejiang (CN); Yongxiang Tan, Zhejiang (CN); Weihua Liu, Zhejiang (CN); Linjie Huang, Zhejiang (CN)

(73) Assignee: Hangzhou Sanhua Research Institute Co., Ltd., Hangzhou, Zhejiang (CN)

( * ) Notice: Subject to any disclaimer, the term of this patent is extended or adjusted under 35 U.S.C. 154(b) by 167 days.

(21) Appl. No.: 14/787,334

(22) PCT Filed: Feb. 26, 2014

(86) PCT No.: PCT/CN2014/072550
§ 371 (c)(1),
(2) Date: Oct. 27, 2015

(87) PCT Pub. No.: WO2014/173201
PCT Pub. Date: Oct. 30, 2014

(65) Prior Publication Data
US 2016/0059666 A1    Mar. 3, 2016

(30) Foreign Application Priority Data
Apr. 27, 2013  (CN) .......................... 2013 1 0151328

(51) Int. Cl.
*B60H 1/00* (2006.01)
*B60H 1/32* (2006.01)
(Continued)

(52) U.S. Cl.
CPC ..... *B60H 1/00278* (2013.01); *B60H 1/00899* (2013.01); *B60H 1/00921* (2013.01);
(Continued)

(58) Field of Classification Search
CPC .. B60H 1/00278; B60H 1/22; B60H 1/00899; B60H 1/00921; B60H 1/3227;
(Continued)

(56) References Cited

U.S. PATENT DOCUMENTS

2013/0055751 A1    3/2013  Inaba

FOREIGN PATENT DOCUMENTS

| CN | 1847750 A | 10/2006 |
| CN | 101551174 A | 10/2009 |

(Continued)

OTHER PUBLICATIONS

International Search Report of Internation Application No. PCT/CN2014/072550.
(Continued)

*Primary Examiner* — Emmanuel Duke
(74) *Attorney, Agent, or Firm* — Boyle Fredrickson, S.C.

(57) ABSTRACT

An air conditioning system comprises a compressor (1), an outdoor heat exchanger (3), a first heat exchanger (101), a second heat exchanger (102) and at least two throttling devices, wherein the outdoor heat exchanger is a micro-passage heat exchanger and comprises a first inlet (31), a second inlet (32), an outlet (33), a distributing pipe (36), a collecting pipe (37), a flat pipe (38), a fin (39) and a distributor (34) which is located in the distributing pipe (36) and used for distributing a working medium, and a distribution small hole (35) is provided in the distributor (34); and the first inlet (31) is in direct communication with a distributing cavity (30) of the distributing pipe (36), while the second inlet (32) is in communication with the distributing cavity (30) through the distributing small hole (35) in the distributor (34).

20 Claims, 6 Drawing Sheets

(51) Int. Cl.
    *F25B 13/00* (2006.01)
    *F28F 9/00* (2006.01)
    *F28F 9/02* (2006.01)
    *F28D 1/053* (2006.01)
    *B60H 1/22* (2006.01)
    *F28D 21/00* (2006.01)

(52) U.S. Cl.
    CPC ............ *B60H 1/22* (2013.01); *B60H 1/3227* (2013.01); *F25B 13/00* (2013.01); *F28D 1/05366* (2013.01); *F28F 9/00* (2013.01); *F28F 9/0246* (2013.01); *F28F 9/0273* (2013.01); *B60H 2001/00928* (2013.01); *B60H 2001/2296* (2013.01); *F25B 2313/02343* (2013.01); *F25B 2400/0411* (2013.01); *F25B 2400/13* (2013.01); *F28D 2021/0084* (2013.01); *F28D 2021/0085* (2013.01)

(58) Field of Classification Search
    CPC .. B60H 2001/2296; B60H 2001/00928; F25D 1/05366; F28F 9/00; F28F 9/0273; F28F 9/0246; F28D 2021/0084; F28D 2021/0085; F25B 2313/02343; F25B 2400/0411
    See application file for complete search history.

(56) References Cited

FOREIGN PATENT DOCUMENTS

| | | | |
|---|---|---|---|
| CN | 101782295 | A | 7/2010 |
| CN | 201522149 | U | 7/2010 |
| CN | 102313400 | A * | 1/2012 |
| CN | 202511527 | U | 10/2012 |
| CN | 102927722 | A | 2/2013 |
| CN | 202747508 | U * | 2/2013 |
| CN | 202792701 | U | 3/2013 |
| JP | H07223429 | A | 8/1995 |
| JP | 2001030743 | A | 2/2001 |
| JP | 3196341 | B2 | 8/2001 |
| WO | 9414021 | A1 | 6/1994 |

OTHER PUBLICATIONS

EP Search Report for Application No. 14788594.1; Dated Feb. 23, 2017.
CN Office Action for Application No. 201310151328.9; Dated Feb. 27, 2017.

* cited by examiner

_US 9,751,378 B2_

AIR CONDITIONING SYSTEM AND HEAT EXCHANGER

This application is a National Phase entry of PCT Application No. PCT/CN2014/072550, filed Feb. 26, 2014, which application claims the benefit of priorities to Chinese Patent Application No. 201310151328.9 titled "AIR CONDITIONING SYSTEM AND HEAT EXCHANGER", filed with the Chinese State Intellectual Property Office on Apr. 27, 2013, the entire disclosure of which is incorporated herein by reference.

TECHNICAL FIELD

The present application relates to the technical field of air conditioning, and particularly to an automotive an conditioning system and a heat exchanger applied in the an conditioning system.

BACKGROUND

With the developing of low carbon energy, stricter requirements have been made to energy conservation and emission reduction. New energy automobiles are taken as a strategic direction of the automobile industry development for various countries in the world. Electric automobiles or hybrid automobiles have become one of the future developing directions for automobiles due to having a characteristic of energy conservation and emission reduction. The electric automobiles, however, employ a battery as the power source, since the battery is a core component, a cost of the battery and a ratio of a capacity to a weight of the battery restrict the development of the new energy automobiles. An air conditioning system of the electric automobile is also different from that of an original automotive air conditioning system. For a conventional internal combustion engine automobile, exhaust heat of an internal combustion engine and exhaust gas heat of an engine are used for heating a compartment, however, a power for the electric automobile is mainly from an electrical machine, and there is no exhaust gas heat of the engine that can be used.

In addition, in the conventional internal combustion engine automobile, a blower and a condenser motor are main electric power consuming devices in the automotive air conditioning, while electric power consuming devices in the electric automobile/the hybrid automobile are not only the blower and the condenser motor, for example:

Firstly, there is no engine to drive a compressor, thus the compressor completely relies on the electric power.

Secondly, since there is no engine, there is no exhaust heat of the engine to be used in a heating process, and the heating process also completely relies on the electric power, thus a main issue for the air conditioning of the electric automobile or the hybrid automobile is to improve utilization rate of electric energy.

Thirdly, for poor environmental areas, such as areas where are extremely hot in summer or areas where are extremely cold in winter, to improve the utilization rate of the electric energy is particularly crucial.

In an air conditioning system of an electric automobile in FIG. 8, this system has two main cycles, that is, a refrigerating cycle 1000 and a heating cycle 2000. The air conditioning system of the electric automobile includes two air conditioning case assemblies, that is, a compartment air conditioning case 1010 and a battery module air conditioning case 1020. The compartment air conditioning case 1010 includes a compartment evaporator 1011 and a compartment heater 1012, and the battery module air conditioning case 1020 includes a battery module evaporator 1021 and a battery module heater 1022. During the refrigerating cycle 1000, an operating process of the air conditioning system of the electric automobile is as follows: in a summer working condition, the air conditioning is started; a compressor 1001 starts to work and consumes a certain amount of electric energy to compress a low-temperature and low-pressure gaseous working medium into a high-temperature and high-pressure gaseous working medium. The working medium releases heat when flowing through a condenser 1002, and the heat released by the working medium is absorbed by an ambient air, and the working medium has a phase change and is condensed into a liquid working medium. A temperature and a pressure of the working medium are reduced when the liquid working medium flows through an expansion valve 1003 and/or an expansion valve 1005, the working medium then absorbs heat of air in a compartment and/or a battery when flowing through the compartment evaporator 1011 and/or the battery module evaporator 1021, the working medium has phase change and is evaporated into the gaseous working medium, thus the low-temperature and low-pressure gaseous working medium is compressed into the high-temperature and high-pressure gaseous working medium by the compressor 1011. The above process is repeated again and again. The two evaporators 1011 and 1021 in the air conditioning system may separately operate, and flow passages are controlled through connection and disconnections of two solenoid valves 1004 and 1006.

And during the heating cycle 2000, the operating process of the air conditioning system of the electric automobile is that: in a winter working condition, an electric heater 2003 is energized to heat a working medium in the heating cycle 2000, and meanwhile a water pump 2001 is started to pump the heated working medium to a heater 1012 and/or a heater 1022, the air in the compartment and/or the battery is heated, and flow passages are controlled through connections and disconnections of two solenoid valves 2004 and 2006.

The above air conditioning system, however, still has the following disadvantages.

1. During the refrigerating cycle, a suction temperature of the compressor is substantially equal to vaporization temperatures of outlet ends of the evaporators 1011 and 1021, and a suction pressure of the compressor is substantially equal to vaporization pressures of the outlet ends of the evaporators 1011 and 1021, therefore when the air conditioning system is in a high-temperature area, where is extreme hot, the suction temperature and the suction pressure of the compressor are relatively low, thus a compression efficiency of the compressor is decreased, and also requirements for enough refrigerating capacity cannot be guaranteed.

2. The refrigerating cycle employs the air conditioning system in the conventional automobile to cool the compartment or the battery simultaneously or separately; while the heating cycle employs a high pressure positive temperature coefficient, that is, an electrical heating manner, to cool the compartment or the battery simultaneously or separately. When the electrical heating is employed, the highest efficiency thereof is 100%. Thus, the air conditioning system includes a heating cycle system of the working medium in the heating cycle 2000 besides the refrigerating cycle, that is the air conditioning system has a very complicated structure.

3. And during the heating cycle, the working medium is heated completely by consuming the electric energy in an electrical energy system of the whole automobile, and the air in the compartment and/or the battery exchange heat with relatively hot working medium in a radiator, and then the heated air is delivered to the compartment and/or the battery. There must be heat loss in these heat exchanging process, thus the efficiency of the heating cycle is absolutely less than 1.

4. In addition, during the heating cycle, since the working medium in the heating cycle 2000 has a relatively large specific heat, and a power of the electric heater is limited, the temperature of the working medium in the heating cycle 2000 is slowly increased, and a temperature of the air is also slowly increased, thereby adversely affecting a comfort of passengers.

5. Since a heating device such as the battery has a low temperature when the heating device is just started, and the temperature of the heating unit is slowly increased, thus an operation performance of the heating unit, such as the battery may be adversely affected (for example, a travel mileage may be shortened, or a service life may be shortened).

6. The air conditioning system includes both the refrigerating cycle of the working medium and the heating cycle of the working medium in the heating cycle 2000, thus the number of parts is relatively large, the structure of the air conditioning system is relatively complicated, thus it is difficult to arrange the air conditioning system in the automobile, and a manufacturing cost is relatively high.

Therefore, the automotive air conditioning system needs to be modified into a heat pump type air conditioning system, however, the conventional heat pump type air conditioning generally does not use a micro-channel heat exchanger as an outdoor heat exchanger.

SUMMARY

A technical issue to be addressed by the present application is to provide an air conditioning system, which may use a micro-channel heat exchanger as an outdoor heat exchanger, and allow a working medium to directly enter a distribution pipe of the air conditioning system during a. refrigeration, thus a pressure loss of the working medium entering the outdoor heat exchanger during the refrigeration may be reduced, and the efficiency of the an conditioning system during the refrigeration is improved.

For addressing the above technical issue, an air conditioning system is provided according to the present application, which includes a refrigerating mode and a heating mode. The air conditioning system includes a compressor, and an outdoor heat exchanger for exchanging heat with an ambient environment. The air conditioning system further includes a first heat exchanger, a second heat exchanger, and at least two throttling devices, and the throttling devices include a first throttling device and a second throttling device. The outdoor heat exchanger is a micro-channel heat exchanger, which includes a first inlet, a second inlet, an outlet, a distribution pipe, a manifold, a plurality of flat tubes for communicating the distribution pipe with the manifold, fins fixed between flat tubes, and a distributor located in the distribution pipe to distribute a working medium. The distributor is provided with distribution holes, and the distribution holes are in communication with a distribution cavity of the distribution pipe. The first inlet of the outdoor heat exchanger is in communication with the distribution cavity of the distribution pipe directly, while the second inlet of the outdoor heat exchanger is in communication with the distribution cavity via the distribution holes in the distributor. The outlet of the outdoor heat exchanger is in communication with the manifold. In the refrigerating mode, the working medium at gaseous enters the distribution pipe of the outdoor heat exchanger via the first inlet of the outdoor heat exchanger or the first inlet and the second inlet of the outdoor heat exchanger. In the heating mode, the working medium enters the distribution pipe of the outdoor heat exchanger via the second inlet of the outdoor heat exchanger.

The first throttling device is arranged between the second inlet of the outdoor heat exchanger and the second heat exchanger, the second throttling device is arranged upstream of the first heat exchanger, and the first throttling device is connected to the second inlet of the outdoor heat exchanger directly or via pipelines; an outlet of the compressor is connected to an inlet of the second heat exchanger via pipelines, or is connected to the first inlet of the outdoor heat exchanger, or is connected to the first inlet of the outdoor heat exchanger via the second heat exchanger; an inlet of the compressor is connected to an outlet of the first heat exchanger, or the outlet of the outdoor heat exchanger via pipelines.

A pipeline coming out of the outlet of the outdoor heat exchanger is divided into at least two branches, a first branch of at least two branches is connected to the inlet of the compressor via control valves and pipelines; a second branch of at least two branches is connected to an inlet of the first heat exchanger via the second throttling device or the second throttling device and the control valves and pipelines; the outlet of the first heat exchanger is connected to the inlet of the compressor via pipelines; positions of the first inlet, the second inlet of the outdoor heat exchanger are higher than a position of the outlet of the outdoor heat exchanger, and when the outdoor heat exchanger is arranged, a position where the distribution pipe is located, is higher than a height where the distribution pipe is located. It should be noted that, pipe connecting mentioned in this specification is not only referred to as the pipelines, multiple control valves or other necessary air conditioning components, such as a one-way valve, a gas-liquid separator, a liquid storage device, and a solenoid valve may also be provided in the pipelines, and these should be appreciated.

The air conditioning system further includes an intermediate heat exchanger, which is a dual channel heat exchanger. The intermediate heat exchanger includes a first heat exchanging unit and a second heat exchanging unit that are isolated from each other but may exchange heat with each other. An inlet of the first heat exchanging unit is connected to an outlet pipeline of the second heat exchanger, and an outlet of the first heat exchanging unit is connected to the second inlet of the outdoor heat exchanger via the first throttling device and pipelines; an inlet of the second beat exchanging unit is connected to the outlet of the first heat exchanging unit via a third throttling device, and an outlet of the second heat exchanging unit is connected to the inlet of the compressor via pipelines; in the heating mode, the working medium of the second heat exchanging unit is throttled by the third throttling device, and the first heat exchanging unit exchanges heat with the throttled working medium so as to decrease a temperature of the working medium passing through the first heat exchanging unit.

The air conditioning system is an air conditioning system for an electric automobile or a hybrid automobile, the an conditioning system further includes a battery heat exchanger for providing cold energy to a battery, and a fourth throttling device arranged upstream of the battery heat exchanger; the fourth throttling device has one end connected to an outlet of the outdoor heat exchanger via pipelines, and the outlet of the battery heat exchanger is connected to the inlet of the compressor via pipelines.

In the case that the air conditioning system is in the refrigerating mode, after the working medium at high-temperature and high-pressure being cooled by the outdoor heat exchanger, the working medium coming out of the outlet of the outdoor heat exchanger is divided into two branches: the working medium in one branch is throttled by the second throttling device and flows to the first heat exchanger after a temperature and a pressure of the working medium are decreased; the working medium in another branch flows to the battery heat exchanger to cool the battery after being throttled by the fourth throttling device; outlet pipelines of the first heat exchanger and the battery heat exchanger are connected and joined together and then is connected to a pipeline of the compressor, or is connected to the compressor through a gas-liquid separator and pipelines.

In the case that the air conditioning system is in the heating mode, after the working medium at low-temperature and low-pressure passing through the outdoor heat exchanger, one part of the working medium coming out of the outlet of the outdoor heat exchanger returns to the compressor by passing through the pipelines or a gas-liquid separator and pipelines, and another part selectively communicates with the battery heat exchanger for providing the cold energy to the battery.

The air conditioning system further includes a defrosting mode and a dehumidifying mode. In the defrosting mode, the first inlet of the outdoor heat exchanger is connected to the pipeline coming out of the outlet of the compressor, the outlet of the outdoor heat exchanger is connected to the inlet of the compressor via pipelines, and the working medium at high-temperature and high-pressure gaseous enters the outdoor heat exchanger via the first inlet of the outdoor heat exchanger, and releases heat to realize the defrosting; in the dehumidifying mode, the working medium coming out of the outlet of the compressor firstly passes through the second heat exchanger, returns to the outdoor heat exchanger, and then flows to the first heat exchanger after being throttled via the second throttling device; air blowing into an interior firstly is cooled down and dehumidified via the first heat exchanger, and then is heated and dehumidified via the second heat exchanger.

In addition, a heat exchanger applied in the above heat pump system is further provided by the present application, and the heat exchanger is used in the air conditioning system to exchange heat with an outdoor environment. The heat exchanger is a micro-channel heat exchanger, which includes a distribution pipe, a manifold, multiple flat tubes for communicating the distribution pipe with the manifold, fins fixed between flat tubes, a distributor located in the distribution pipe to distribute a working medium, a first inlet and a second inlet in communication with the distribution pipe, and an outlet in communication with the manifold. The distributor is provided with distribution holes, and the distribution holes are in communication with a distribution cavity of the distribution pipe. The first inlet of the outdoor heat exchanger is in communication with the distribution cavity of the distribution pipe directly, while the second inlet of the outdoor heat exchanger is in communication with the distribution cavity via the distribution holes in the distributor. A partition plate is not provided in the distribution cavity of the distribution pipe which is in communication with the first inlet and the second inlet to separate the distribution cavity, and the manifold in communication with the outlet of the micro-channel heat exchanger is also not provided with a partition plate to separate an inner cavity of the manifold.

The distribution pipe includes a pipe body and end caps at end portions, and the pipe body and the end caps are fixed by welding; the second inlet is arranged on a second connecting pipe, and the second connecting pipe is fixed to the end caps by welding; a connecting pipe where the first inlet is located is fixed to the end cap, the pipe body or an end portion of another end of the distribution pipe by welding; and a circulation area of the first inlet is greater than or equal to a circulation area of the second inlet, and a length of the connecting pipe, where the second inlet is located, extending into the distribution cavity is greater than a length of the connecting pipe, where the first inlet is located, extending into the distribution cavity.

The heat exchanger is the outdoor heat exchanger used in the heat pump type air conditioning system; in the case that the air conditioning system operates in the refrigerating mode, the working medium enters the distribution cavity of the distribution pipe of the outdoor heat exchanger via the first inlet or the first inlet, and the second inlet; in the case that the air conditioning system operates in the heating mode, the working medium enters the distribution cavity of the distribution pipe of the outdoor heat exchanger via the second inlet; and positions of the first inlet and the second inlet of the heat exchanger are both higher than a position of the outlet of the outdoor heat exchanger, and a position where the distribution pipe is located when the heat exchanger is mounted is higher than a position where the manifold is located. Since a position of the distribution pipe is higher than a position of the manifold, the working medium always circulates from the distribution cavity of the distribution pipe to the inner cavity of the manifold via the flat tubes no matter in the refrigerating mode or the heating mode, facilitating oil in the working medium flowing back, thereby stabilizing the air conditioning system.

Compared with the conventional technology, the above technical solutions all employs the micro-channel heat exchanger as the outdoor heat exchanger, and flowing directions in the refrigerating mode and in the heating mode are same, and most of or all of the working medium directly enters the distribution cavity of the distribution pipe, rather than entering the inner cavity of the distribution pipe via the distributor, in this way, a pressure loss of the working medium passing through the outdoor heat exchanger in the refrigerating mode is reduced, and the efficiency of the air conditioning system is improved. And since the micro-channel heat exchanger is adopted as the outdoor heat exchanger, a volume of the outdoor heat exchanger is decreased, and the heat exchanging effect of the air conditioning system is better.

DETAILED DESCRIPTION

An air conditioning system is provided according to the present application, in which a four-way valve is not required, and a refrigerating function or a heating function cart be realized via a simple switch of a flow passage. Different from the way that a working medium is delivered into a heat exchanger via an outdoor heat exchanger during the refrigerating process and the heating process, the air conditioning system according to the present application allows a pressure loss to be significantly decreased when the working medium enters the heat exchanger in a gaseous form, thereby improving the efficiency of the air conditioning system. A heat exchanging implementing the above air conditioning system is also provided.

For making those skilled in the field to better understand technical solutions of the present application, the present application is described in further details in conjunction with drawings and specific embodiments.

Figure 1:
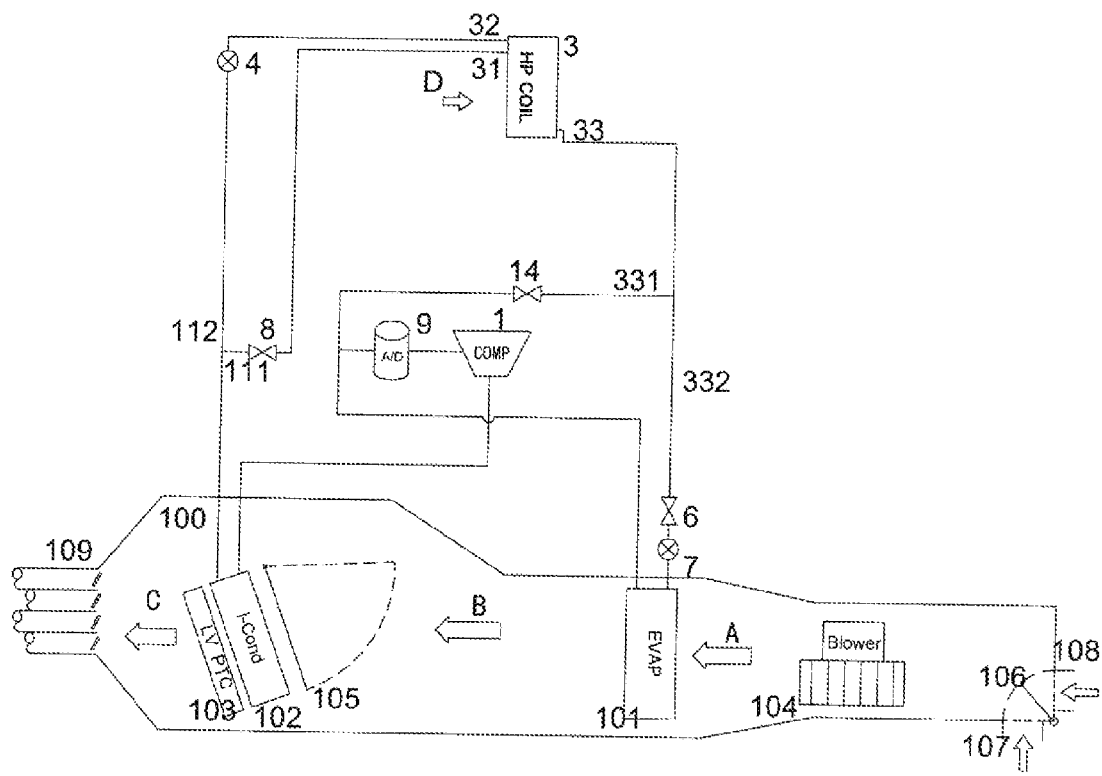
FIG. 1 is a schematic view showing a pipeline connection of an air conditioning according to a first embodiment of the present application.
Figure 2:
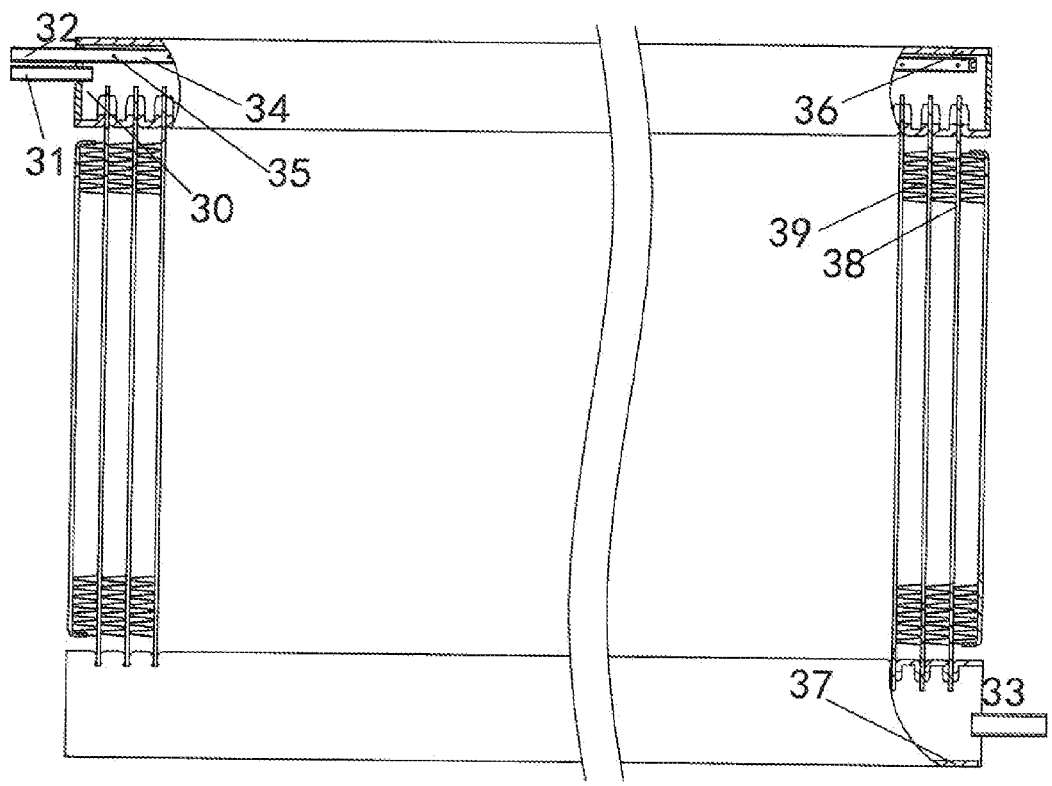
FIG. 2 is a schematic view showing a partial structure of an outdoor heat exchanger in the an conditioning system in FIG. 1.

Reference is made to FIG. 1 and FIG. 2. FIG. 1 is a schematic view showing a pipeline connection of an air conditioning system according to a first embodiment of the present application. FIG. 2 is a schematic view showing a partial structure of an outdoor heat exchanger in the air conditioning system in FIG. 1. The outdoor heat exchanger in this specification is named with respect to an indoor heat exchanger, such as the outdoor heat exchanger for exchanging heat with an exterior environment in a household air conditioner, or a heat exchanger for exchanging heat with an outside of the compartment in an automotive air conditioning.

In the first embodiment, the air conditioning system is an automotive air conditioning system, an operating mode of which includes a refrigerating mode, a heating mode and a dehumidifying mode. The automotive air conditioning system includes a compressor 1, an outdoor heat exchanger 3 for exchanging heat with an exterior environment, a first air conditioning case 100 and at least two throttling device. The throttling device includes a first throttling device 4 and a second throttling device 7. The air conditioning system does not include a four-way valve. The first air conditioning case 100 is configured to adjust an indoor temperature and/or humidity. The first air conditioning case 100 includes a first heat exchanger 101 and a second heat exchanger 102. The air conditioning system further includes a second stop valve 6 connected upstream of the first heat exchanger 101 and connected upstream of or downstream of the second throttling device. An outlet pipeline of the compressor 1 is connected to the second heat exchanger 102, and an outlet of the second heat exchanger is connected to the outdoor heat exchanger 3. The outdoor heat exchanger 3 includes a first inlet 31, a second inlet 32 and an outlet 33, through which the outdoor heat exchanger 3 is connected to the air conditioning system. The second inlet 32 is connected to the second heat exchanger 102 via the first throttling device 4 and pipelines. The first inlet 31 is connected to the second heat exchanger 102 via a first stop valve 8 and pipelines, or a pipeline through which the second inlet 32 is connected to the first throttling device 4 and a pipeline through which the first inlet 31 is connected to the first stop valve 8 are connected in parallel and then are gathered together and further connected to the outlet of the second heat exchanger 102. A pipeline from the outlet 33 of the outdoor heat exchanger 3 is divided into two branches, that is, a first branch 331 connected to an inlet of the compressor via a third stop valve 14 and a gas-liquid separator 9, and a second branch 332 connected to an inlet of the first heat exchanger 101 via the second stop valve 6 and the second throttling device 7. An outlet of the first heat exchanger 101 is connected to an inlet of the compressor 1 via the gas-liquid separator 9.

Figure 2A:
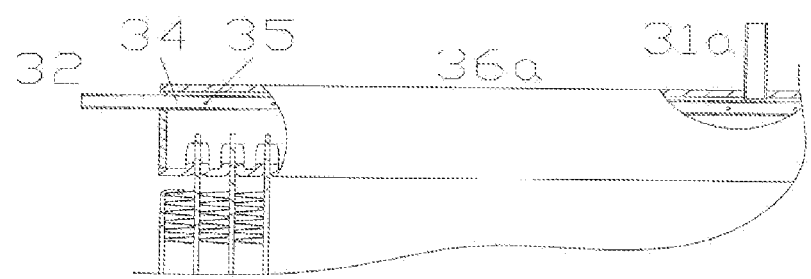
FIG. 2a is a schematic view showing a partial structure of a distributor of the outdoor heat exchanger in the air conditioning system in FIG. 1 according to another embodiment.
Figure 2B:
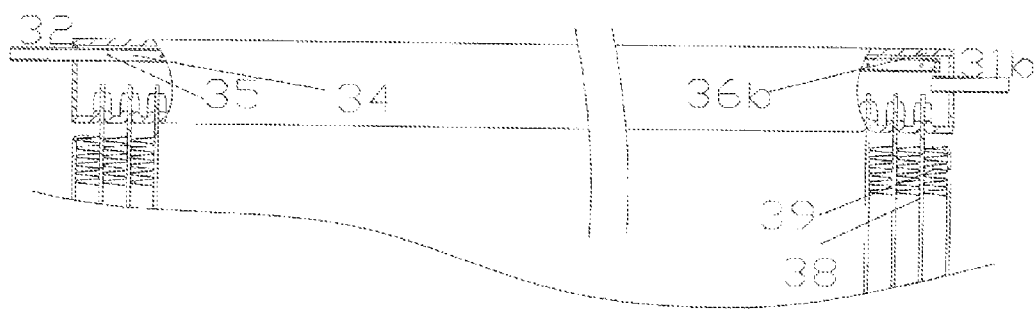
FIG. 2b is a schematic view showing a partial structure of the distributor of the outdoor heat exchanger in the air conditioning system in FIG. 1 according to yet another embodiment.

Specifically, the outdoor heat exchanger 3 is a microchannel heat exchanger, which includes a distribution pipe 36, a manifold 37, a number of flat tubes 38 communicating the distribution pipe 36 with the manifold 37, a fin 39 fixed between the flat tubes, and a distributor 34 located in the distribution pipe 36 configured to distribute a working medium. The distribution pipe 36 and the manifold 37 are respectively provided with multiple flat tube slots configured to mount the flat tubes, and the flat tubes are welded to the distribution pipe 36 and the manifold 37 respectively for being sealed. The distributor 34 is distributed with a number of distribution holes 35, and the distribution holes 35 may be uniformly arranged. A partition plate for separating fluid is not provided in both of the distribution pipe 36 and the manifold 37, that is, the micro-channel heat exchanger is of a one-way flow structure from the distribution pipe to the manifold, instead of a reciprocating flow structure or a structure having opposite flowing directions during heating and refrigeration. Further, when the outdoor heat exchanger 3 is assembled, the distribution pipe 36 is arranged to be slightly higher than the manifold 37, for example, the distribution pipe 36 is arranged above the manifold 37 in a perpendicular direction or an oblique direction. The distribution pipe specifically may include a cylindrical pipe body in the middle, and end caps at end portions and the pipe body and the end caps are fixed by welding. The first inlet 31 and the second inlet 32 may be fixed by welding connecting pipes, where the first inlet 31 and the second inlet 32 are located, to the end cap at one end of the distribution pipe, as shown in FIG. 2. Besides the first inlet 31 and the second inlet 32 may be fixed by welding the connecting pipes thereof to a middle portion of the pipe body of the distribution pipe, as shown in FIG. 2a. Or, the first inlet 31 and the second inlet 32 may be arranged as shown in FIG. 2b, in which a first connecting port 31b is fixed by welding the connecting pipe to the end cap at another end of the distribution pipe. The first inlet 31 is directly in communication with an inner cavity of the distribution pipe, i.e., a distribution cavity 30, while the second inlet 32 is in communication with the distribution cavity 30 via the distribution holes 35 in the distributor 34.

In the refrigerating mode, the first stop valve 8 is open, the second valve 6 is also open, and the third valve 14 is closed. The compressor 1 consumes a certain amount of electrical energy to compress a refrigerant as the working medium at a low-temperature and low-pressure gaseous into the refrigerant at high-temperature and high-pressure gaseous. The working medium reaches the second heat exchanger 102 via pipelines from the outlet of the compressor 1 to arrive at, at this time, a temperature air door 105 is closed, that is, air flow hardly exchange heat with the second heat exchanger 102. After passing through the second heat exchanger 102, the working medium passes through a first branch 111, and gets through the first stop valve 8 and the first inlet 31 to flow into the outdoor heat exchanger 3 and release heat. The high-temperature and high-pressure refrigerant working medium is cooled by an outdoor air flow D in the outdoor heat exchanger, and then has a phase change and is condensed or partially condensed and meanwhile releases heat. The released heat is carried by the air flow D into an ambient air. Then the working medium passes through the second stop valve 6 from the outlet 33 of the outdoor heat exchanger 3, and is throttled by the second throttling device 7 and then flows into the first heat exchanger 101. The low-temperature and low-pressure working medium absorbs heat in air flow A in the first heat exchanger 101, and has phase change and is partially evaporated to the working medium at gaseous. The working medium is separated via the gas-liquid separator 9 after corning out of the first heat exchanger 101, the liquid refrigerant is stored inside the gas-liquid separator 9, and the low-temperature and low-pressure gaseous working medium is compressed into the high-temperature and high-pressure gaseous working medium by the compressor 1. The above process is repeated again and again.

The gaseous working medium herein flows into the outdoor heat exchanger 3 via the first inlet 31, and the first inlet 31 is directly in communication with the distribution cavity 30 of the distribution pipe 36, rather than passing through the distribution holes 35 of the distributor to flow to the distribution cavity 30, thus a flow resistance of the working medium is significantly reduced and the efficiency of the air conditioning system is improved.

In addition, in the refrigerating mode, the first throttling device may be opened to the largest degree to allow the working medium to enter the distribution pipe of the outdoor heat exchanger via the first inlet and the second inlet at the same time, which further reduces the flow resistance of the working medium.

In the heating mode, the first stop valve 8 is closed, the second stop valve 6 is also closed, the third stop valve 14 is opened. The compressor 1 consumes a certain amount of electrical energy to compress the low-temperature and low-pressure gaseous working medium into the high-temperature and high-pressure gaseous refrigerant. The working medium passes through the pipelines to reach the second heat exchanger 102 from the outlet of the compressor 1, at this time the temperature air door 105 is opened to allow an air flow B to exchange heat with the second heat exchanger 102, the air flow B absorbs the heat of the high-temperature working medium of a and the temperature of the air flow B is increased and then is blown into a room, which improves an ambient temperature in the room. After passing through the second heat exchanger 102, the working medium passes through a second branch 112. After the working medium is throttled via the first throttling device, and after the temperature and pressure of the working medium are decreased, the working medium flows into the distributor 34 of the outdoor heat exchanger 3 via the second inlet 32 and then is distributed into the distribution cavity 30 via the distribution holes 35. The low-temperature and low-pressure working medium exchanges heat with the outdoor air flow D in the outdoor heat exchanger 3 to absorb the heat of the air flow D, and a cold energy released by the working medium is carried into the ambient air by the air flow D. Then the working medium passes through the third stop valve 14 from the outlet 33 of the outdoor heat exchanger 3, and is separated via the gas-liquid separator 9, the liquid refrigerant is stored in the gas-liquid separator 9, and the low-temperature and low-pressure gaseous working medium is compressed into the high-temperature and high-pressure gaseous working medium by the compressor. The above process is repeated again and again.

The liquid working medium or gas-liquid two-phase working medium flows into the outdoor heat exchanger 3 via the second inlet 32, and the second inlet 32 is in communication with the distributor 34 of the distribution pipe 36 and then is in communication with the distribution cavity via the distribution holes 35 of the distributor 34, thus the working medium is allowed to be distributed into the flat tubes 38 uniformly, which enables the outdoor heat exchanger to exchange heat uniformly, and the heat exchanging efficiency is further improved.

The dehumidifying mode is substantially same as the refrigerating mode. The difference lies in that the air door 105 may be opened, so that the when the air flow B flows through the second heat exchanger 102, the temperature of the air flow B may be increased. The air flow A firstly passes through the first heat exchanger 101 to be cooled and dehumidified, and then passes through the second heat exchanger to rise the temperature, and further dehumidified, thus a humidity of the air blown into the room may be decreased, thereby realizing dehumidification. The specifies are not described in further details hereinafter.

Figure 3:
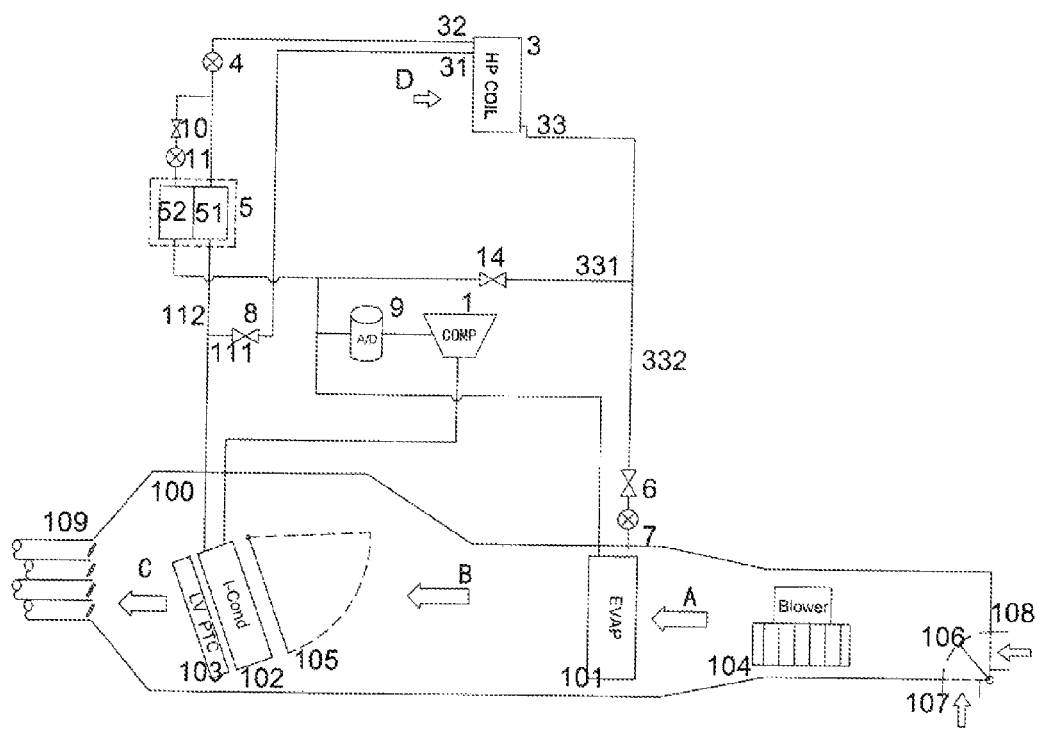
FIG. 3 is a schematic view showing the pipe connection of the air conditioning system according to a second embodiment of the present application.

A second embodiment of the present application is described as follows. As shown in FIG. 3, FIG. 3 is a schematic view showing the pipeline connection of an air conditioning system according to the second embodiment of the present application. A main difference between this embodiment and the first embodiment described above is that the air conditioning system in this embodiment further includes an intermediate heat exchanger 5. The intermediate heat exchanger 5 is a dual channel heat exchanger, which includes a first heat exchanging unit 51 and a second heat exchanging unit 52 that are isolated from each other but may exchange heat with each other. Specifically, an inlet of the first heat exchanging unit 51 is connected to an outlet pipeline of the second heat exchanger, and an outlet of the first heat exchanging unit 51 is connected to a pipeline of the first throttling device 4. An inlet of the second heat exchanging unit 52 is connected to the outlet of the first heat exchanging unit 51 via a third throttling device 11 and a fourth stop valve 10, and an outlet of the second heat exchanging unit 52 is connected to the inlet of the compressor 1 via pipelines. In this way, in the heating mode, after passing through the second heat exchanger 102, the working medium firstly reaches the first heat exchanging unit 51 of the intermediate heat exchanger 5, and the working medium coming out of the first heat exchanging unit 51 is divided into two branches. One branch still passes through the first throttling device 4 to flow into the outdoor heat exchanger 3, while another branch passes through the fourth stop valve 10, and flows into the second heat exchanging unit 52 of the intermediate heat exchanger 5 after being throttled and cooled by the third throttling device 11. Thus in the intermediate heat exchanger 5, the low-temperature second heat exchanging unit 52 performs heat exchange with the high-temperature first heat exchanging unit 51, which allows the temperature of the working medium passing through the first heat exchanging unit 51 to be decreased and may further decrease the temperature of the working medium when the working medium reaches the outdoor heat exchanger after the working medium being throttled, thus a temperature difference between the working medium and the environment is therefore increased, and an heat exchanging efficiency of the outdoor heat exchanger is further improved, and a heating efficiency under a low temperature condition is improved.

Figure 4:
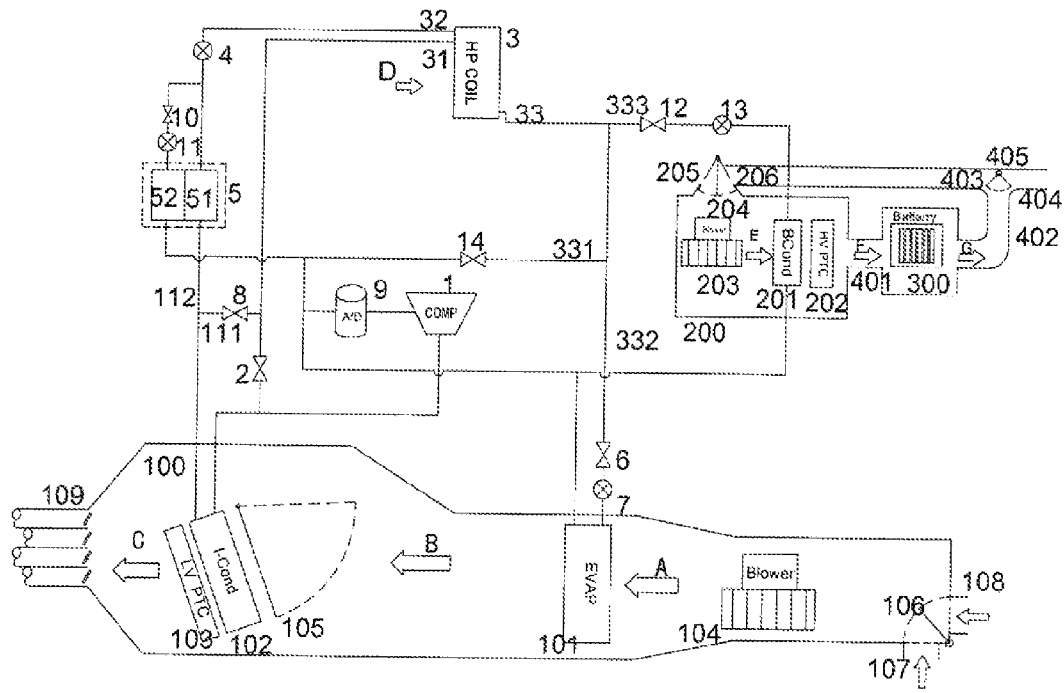
FIG. 4 is a schematic view showing the pipe connection of an automotive air conditioning system according to an embodiment of the present application.

Another embodiment of the present application is described incorporating FIG. 4 hereinafter. FIG. 4 is a schematic view showing the pipeline connection of an air conditioning system according to another embodiment of the present application, and the air conditioning system is specifically an automotive air conditioning system of an electric automobile or a hybrid electric vehicle. Besides the components described above, the automotive air conditioning system further includes a fifth stop valve 12, a fourth throttling device 13 and a second air conditioning case 200, etc. The second air conditioning case 200 is configured to perform heat management to a heating component, and in this embodiment, the heating component is a battery 300. The air conditioning case 200 includes a second circulation air door 204, an outer-circulation air inlet 205, an inner-circulation air inlet 206, a battery heat exchanger 201, a battery heating element 202 and a second blower 203, etc. Further, component 401 is an air-inlet passage for the battery 300, which is connected to an air outlet of the second air conditioning case 200. Component 402 is an air-out passage for the battery, which is connected to a first air passage 403 and a second air passage 404. The first air passage 403 is connected to the inner-circulation air inlet 206 of the air conditioning case 200. The second air passage 404 is connected to an outside of a compartment, and an air-door 405 is configured to control an outlet air from the air-out passage 402 for the battery to be distributed to the first air passage 403 so as to return the inner-circulation air inlet 206 or be distributed to the second an passage 404 so as to discharge out of the compartment.

Figure 5:
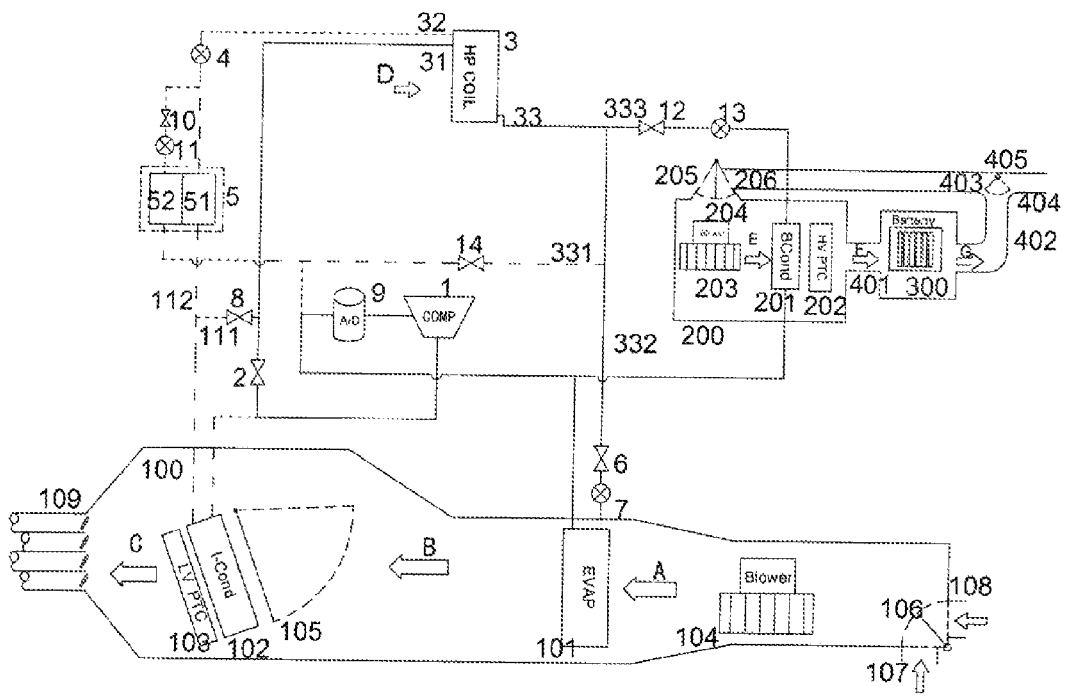
FIG. 5 is a schematic view showing a flowing pattern of the air conditioning system in FIG. 4 in a refrigerating mode, wherein a solid line part generally means the working medium can be circulated, while a dotted line part generally means that the working medium cannot be circulated.

A refrigerating mode is shown in FIG. 5, which is a schematic view showing a flow pattern of the automotive air conditioning, system in the refrigerating mode in FIG. 4, wherein a solid line part generally means that the working medium can be circulated, and a dotted line part generally means that the working medium cannot be circulated. A sixth stop valve 2 here is opened, the first stop valve 8 is closed, the third stop valve 14 is closed, and at least one of the fifth stop valve 12 and the second stop valve 6 is opened. The compressor 1 consumes a certain amount of electric energy to compress the low-temperature and low-pressure gaseous working medium into the high-temperature and high-pressure gaseous working medium, and the working medium flows through the sixth stop valve 2 to flow into the outdoor heat exchanger 3 via the first inlet 31 of the outdoor heat exchanger 3. The high-temperature and high-pressure working medium is cooled by the outdoor air flow D and has phase change to be condensed or partially condensed into the liquid working medium and release heat at the same time. The released heat is carried into the ambient air by the air flow D. The cooled working medium may be divided into two branches after coming out of the outlet 33 of the outdoor heat exchanger 3. One branch of the working medium passes through the second stop valve 6, and is throttled by the second throttling device 7, which becomes the low-temperature and low-pressure working medium after a temperature and a pressure of this branch of the working medium are decreased. The working medium in this branch absorbs the heat in the air flow A in the first heat exchanger 101, and has phase change to be condensed into the gaseous working medium, thereby cooling the air in the compartment. The working medium in another branch passes through the fifth stop valve 12 through a third branch 33, and is throttled by the fourth throttling device 13, and then becomes the low-temperature and low-pressure working medium after a temperature and a pressure of this branch of the working medium are decreased. The low-temperature and low-pressure working medium absorbs heat in an air flow E in the battery heat exchanger 201, and has phase change to be evaporated into the gaseous working medium, joins with the gaseous working medium coming from the first heat exchanger 101 and then is separated by the gas-liquid separator 9. The liquid working medium is stored in the gas-liquid separator 9 after being separated, while the low-temperature and low-pressure gaseous working medium is compressed into the high-temperature and high-pressure gaseous working medium of a by the compressor 1. The above process is repeated again and again.

Whether the battery heat exchanger 201 and the first heat exchanger 101 are cooled depends on states of the air conditioning system, which can be realized simply by controlling the connection or disconnection of the corresponding flow passage, for example, by controlling the connection or disconnection of the second stop valve 6 and the fifth stop valve 12, in this way, a passenger compartment or the battery is separately provided with the cold energy. In the case that an ambient temperature is not very high, the first heat exchanger need not to work, thus the second stop valve 6 is closed. In the case that the ambient temperature or a heat load in the automobile is high, an evaporator in the automobile needs to work, thus the second stop valve 6 is opened. In the case that the ambient temperature is not very high and/or a heat load of the battery case 200 is not very high, the battery heat exchanger 201 does not need to work, thus the fifth stop valve 12 is closed. In the case that the ambient temperature or the heat load of the battery case 200 is high, the battery heat exchanger 201 needs to work, thus the fifth stop valve 12 is opened.

In the case that the first heat exchanger 101 is required to cool the compartment, and the blower 104 functions to deliver the air flow A. The air flow A is cooled down and dehumidified via the first heat exchanger to become an air flow B. The temperature air door 105 here is at a position completely blocking the second heat exchanger 102, and the air flow B bypasses the second heat exchanger 102, that is, the air flow B does not exchange heat with the second heat exchanger 102, and the air flow becomes an air flow C. It can be considered that a state of the air flow C and a state of the air flow B are substantially the same, and the air flow C is delivered into the compartment via a grille and an air passage 109 so as to decrease a temperature in the compartment, thereby providing a comfortable compartment environment. The air flow A is formed by mixing the air passing through an inner circulation air port 107 and an outer circulation air port 108, and a mixed ratio of the mixed air can be controlled by a circulation air door 106 according to the requirements for comfortableness of the air conditioning system. The power consumption may be further saved by the introduction of inner circulation air.

The blower 203 functions to deliver the air flow E, and may have two working modes according to the ambient temperature, that is, a battery case inner circulation mode and a battery case outer circulation mode.

In the battery case inner circulation mode, when the ambient temperature is higher than a temperature of an output air G of the battery, the circulation air door 204 is switched to a position of the outer circulation air inlet 205 to close the outer circulation air inlet 205, and the fifth stop valve 12 here is opened. The working medium is expanded into a two-phase low-temperature and low-pressure fluid via the fourth throttling device 13 and enters the battery heat exchanger 201 to absorb heat of the air flow E, the air flow E is cooled and dehumidified into an air flow F. The air flow F is delivered to a position where the battery 300 is located via the air-in passage 401 to cool the battery so as to keep the battery in a suitable operating temperature range. The air-out passage 402 and the second air passage 404 are completely or partially cut off by the air door 405, which allows the output air G introducing to the battery to pass through the air-out passage 402 to completely or partially return to the inner circulation air inlet 206 via the first air passage 403, and then to be delivered by the blower 203 to be the air flow F, which may save the energy.

In the battery case outer circulation mode, when the ambient temperature is lower than the temperature of the output air G of the battery, the circulation air door 204 may be switched to a position of the inner circulation air inlet 206, that is, the inner circulation air inlet 206 is closed, thus allowing an ambient air to enter the second blower 203 via the outer circulation air inlet 205 to become the air flow E. The second blower 203 delivers the air flow E to the battery heat exchanger 201, and the temperature of the air flow E is decreased by the battery heat exchanger 201, and then the air flow E becomes the air flow F. The air flow F is delivered to the battery 300 via the air passage 401 to cool the battery, at the same time, the air-out passage 402 and the first air passage 403 are cut off by the air door 405, and the output air G of the battery passes through the air-out passage 402 and is discharged to the ambient environment via the second passage 404. In the battery case outer circulation mode, whether the battery heat exchanger 201 operates or not may depend on the temperature of the battery: f the battery needs to be further cooled, the fifth stop valve 12 is opened, the working medium is throttled by the fourth throttling device 13 to become a two-phase low-temperature and low-pressure fluid and then enters the battery heat exchanger 201 to absorb the heat of the air flow E, which allows the air flow E to become a low-temperature gas. The air flow E is cooled and dehumidified into the air flow F, and the air flow F is delivered into the battery 300 via the air passage 401 to cool the battery, thereby keeping the battery in a suitable temperature range. If the battery already operates in the suitable temperature range, the fifth stop valve 12 can be closed, the battery heat exchanger 201 here does not need to operate, which may further save the energy.

Figure 6:
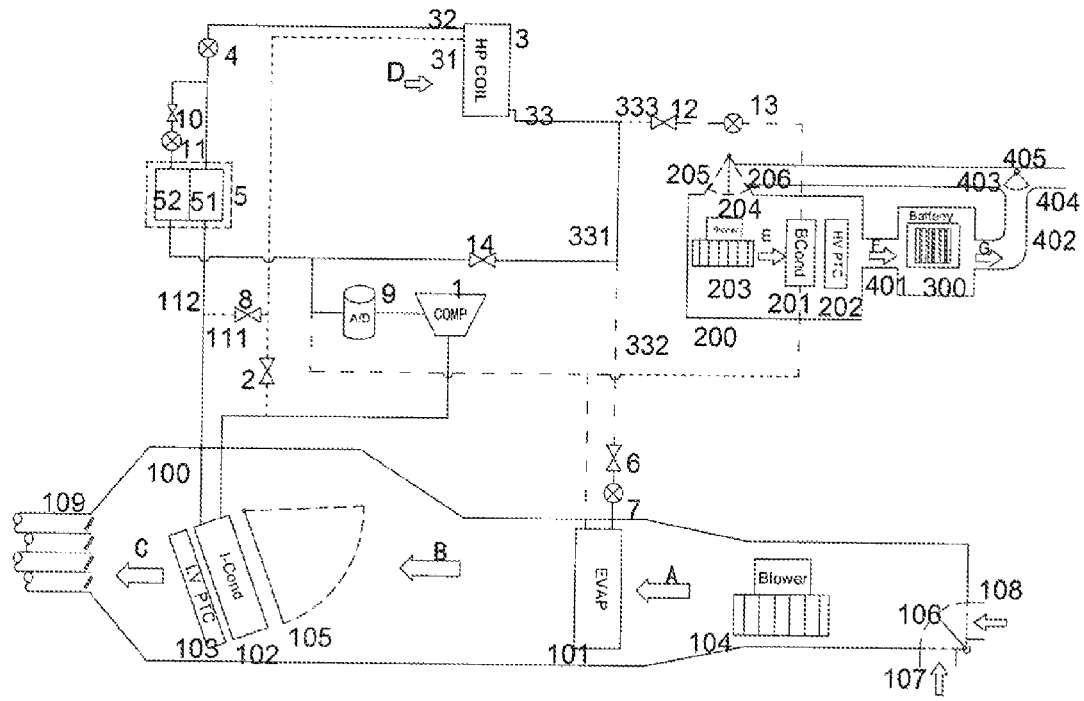
FIG. 6 is a schematic view showing a flowing pattern of the air conditioning system in FIG. 4 in a heating mode, wherein a solid line part generally means the working medium can be circulated, while a dotted line part generally means that the working medium cannot be circulated.

The heating mode is shown in FIG. 6, which is a schematic view showing a flowing pattern of the air conditioning system in FIG. 4 in the heating mode, wherein a solid line part generally means that the working medium can be circulated, while a dotted line part means that the working medium cannot be circulated under a normal circumstance. The sixth stop valve 2 here is closed, the first stop valve 8 is closed, the second stop valve 6 is closed, and the third stop valve 14 is opened. The compressor 1 consumes a certain amount of electric energy to compress the lower-temperature and low-pressure gaseous working medium into the high-temperature and high-pressure gaseous working medium, and the high-temperature and high-pressure gaseous working medium passes through the second heat exchanger 102 and exchanges heat with the low-temperature air flow B. The cooled working medium enters the first heat exchanging unit 51 of the intermediate heat exchanger 5, and the working medium coming out of the first heat exchanging unit 51 is divided into two branches. The working medium in one branch passes through the fourth stop valve 10 to enter the third throttling device 11, which becomes the low-temperature and low-pressure working medium after being throttled, and then enters the second heat exchanging unit 52 of the intermediate heat exchanger 5 to exchange heat with the first heat exchanging unit 51, thus cooling the working medium entering the first heat exchanger unit 51, and the working medium entering the second heat exchanging unit 52 in this branch is heated. The working medium coming out of the first heat exchanging unit 51 in another branch is throttled via the first throttling device 4, which becomes the low-temperature and low-pressure working medium; the two phase low-temperature and low-pressure working medium enters the outdoor heat exchanger 3 via the second inlet 32 of the outdoor heat exchanger 3 to exchanger heat with the outdoor air flow D, and absorbs heat from the outdoor air flow, realizing the function of a heat pump. After coming out of the outlet 33 of the outdoor heat exchanger 3, the working medium passes through the third stop valve 14 and joins the working medium coming out of the second heat exchanging unit 52 of the intermediate heat exchanger 5, the joined working medium enters the gas-liquid separator 9, and then the low-pressure gaseous working medium is compressed into the high-temperature and high-pressure gaseous working medium by the compressor 1. The above process is repeated again and again. The fifth stop valve 12 here is at a closed state, the working medium does not pass through the battery heat exchanger 201, and only the ambient air is used for performing heat exchange with the battery, and the fifth stop valve 12 may also be opened to allow the battery heat exchanger 201 to cool the ambient air and the battery.

The intermediate heat exchanger 5 specifically controls the working medium to flow or not to flow through the second heat exchanging unit 52 of the intermediate heat exchanger 5 by the fourth stop valve 10. In the case that the fourth stop valve 10 is opened, the first heat exchanging unit 51 of the intermediate heat exchanger 5 exchanges heat with the second heat exchanging unit 52 of the intermediate heat exchanger 5, which allows a working range of the heat pump to be increased and the efficiency thereof to be improved, and especially allows an air-out temperature in a low-temperature environment in the heating mode to be improved, thereby improving the efficiency and usage range of the whole air conditioning system. In addition, the intermediate heat exchanger may not be provided in this embodiment. If the intermediate heat exchanger is not provided, the heating efficiency in a lower temperature environment may be not good as the case where the intermediate heat exchanger is provided.

Similarly, the blower 104 functions to deliver the air flow A. The first heat exchanger does not work, and the air flow A passes through the first heat exchanger 101 to become an air flow B with substantially same state, the temperature air door 105 is opened to allow the air flow B to completely pass through the second heat exchanger 102 and thus be heated. The air flow B becomes an air flow C of a high temperature after being heated, and then is delivered into the compartment through the grille and the air passage 109 so as to increase a temperature in the compartment, thus a suitable compartment environment is provided. The air flow A is formed by mixing the air passing through the inner circulation air port 107 and the air passing through the outer circulation air port 108, and a mixed ratio may be controlled by the circulation air door 106 according to the requirements for comfortableness of the air conditioning system, and a proportion of an inner circulation air is targeted to not cause mist on an automobile window. The introduction of the inner circulation air may further save the energy. If the ambient temperature is extremely low, a heating performance of the heat pump is not enough, which may cause the efficiency of the heat pump to be low, or even cause the heat pump unable to work, at this time, an electric heater 103 may be used to assist in heating and work together with the heat pump system to realize the heating function. Thus, the working range of the air conditioning system is further enlarged, thus the usage range of the electric automobile is enlarged, especially at the area of a low temperature, which is cold.

The second blower 203 functions to deliver the air flow E. The battery air conditioning case may have the following working modes according to an ambient temperature, that is a battery heating mode and a battery cooling mode.

In the case that the ambient temperature is very low and the battery needs to be heated, the battery heating element 202 is energized, the air flow E is heated to become an air flow F via the battery heating element 202. The air flow F is delivered into the battery 300 via the air passage 401 to increase a temperature of the battery. The air door 405 cuts off the second air passage 404 and connects the air-out passage 402 and the first air passage 403, meanwhile the circulation air door 204 cuts off the outer circulation air inlet 205 to allow the output air C of the battery to pass through the first air passage 403 to enter the blower via the inner circulation art inlet 206, which may save the energy.

In the case that a temperature of the ambient environment is low and the battery generates heat and needs to be cooled, the temperature of the ambient environment is low, thus the ambient air may be used to cool the battery. The circulation air door 204 opens the outer circulation air inlet 205 and closes the inner circulation air inlet 206, at the same time the air door 405 cuts off the first air passage 403 and connects the air-out passage 402 and the second air passage 404. The air flow E passes through the battery heat exchanger 201 and the battery heating element 202, and both of the battery heat exchanger 201 and the battery heating element 202 do not work, thus a state of the air flow F is the same as a state of the air flow E, and the air flow F cools the battery 300 and then is discharged to the ambient environment via the air-out passage 402 and the second air passage 404. In addition, the fifth stop valve 12 may be opened, the air is cooled by the battery heat exchanger 201, and then the battery is cooled by the air.

In a low-temperature environment, when the heat exchanger operates in the heating mode for too long time frost is easily formed on a surface of the outdoor heat exchanger, thus the outdoor heat exchanger may downgrade and even lose the heat exchanging performance, which makes the efficiency of the air conditioning system reduce or the heating function of the air conditioning system lost. Therefore, there is a need to defrost the outdoor heat exchanger 3. In a defrosting mode, the sixth stop valve 2 and the third stop valve 14 are opened, while other stop valves are closed. The compressor 1 consumes a certain amount of electric energy to compress the low-temperature and low-pressure gaseous working medium into the high-temperature and high-pressure gaseous working medium. The high-temperature and high-pressure gaseous working medium flows through the sixth stop valve 2, enters the outdoor heat exchanger 3 via the first inlet 31, and releases heat so as to allow the frost formed on the outdoor heat exchanger 3 to be rapidly removed. And then, the working medium leaves the outdoor heat exchanger 3 via the outlet 33 of the outdoor heat exchanger 3, and passes through the third stop valve 14 to enter the gas-liquid separator 9. The gas-liquid separator 9 separates the liquid working medium from the gaseous working medium, while the gaseous working medium returns the compressor 1. The above process is repeated again and again until the frost on the outdoor heat exchanger is effectively removed.

In the case that a humidity of the passenger compartment is high, vapor in the air is easily condensed on a window glass of the automobile, which may adversely affect the view and therefore form a potential safety hazard. Thus, a dehumidification, that is the dehumidifying mode, needs to be performed to the an in the passenger compartment. At this time, the sixth stop valve 2 is closed, the first stop valve 8 is opened, and the second stop valve 6 is opened. The compressor 1 consumes a certain amount of electric energy to compress the low-temperature and low-pressure gaseous working medium into the high-temperature and high-pressure gaseous working medium. The high-temperature and high-pressure gaseous working medium enters the second heat exchanger 102 to heat the air flow B, and the air flow B becomes an air flow C after being heated. The working medium is cooled in the second heat exchanger 102, and the cooled working medium flows through the first stop valve 8 and enters the outdoor heat exchanger 3 via the first inlet 31 of the outdoor heat exchanger 3. The high-pressure working medium, is further cooled by the outdoor air flow D in the outdoor heat exchanger 3 and meanwhile releases heat, and the released heat is carried into the ambient air by the air flow D. After coming out of the outlet 33 of the outdoor heat exchanger 3, the liquid working medium passes through the second stop valve 6. The temperature and the pressure of the working medium are reduced after the working medium being throttled through the second throttling device 7, and the working medium is the low-temperature and low-pressure working medium. The working medium absorbs heat from the air flow A in the first heat exchanger 101, and has a phase change and is evaporated into the gaseous working medium, and the gaseous working medium is compressed into the high-temperature and high-pressure gaseous working medium by the compressor 1. The above process is repeated again and again.

The blower 104 functions to deliver the air flow A. The air flow A is cooled and dehumidified via the first heat exchanger 101, and then becomes the low-temperature and low-humidity air flow B. At this time, the temperature air door 105 is at an appropriate position to allow the second heat exchanger 102 to be completely or partially passed through by the air flow B, and the air flow B is heated by the second heat exchanger 102 to become a comfort low-humidity air flow C. The air flow C is delivered into the compartment via the grille and the an passage 109 to decrease the humidity and improve the temperature to comfort people in the compartment, thus providing a comfort compartment environment. The air flow A is formed by mixing the air flowing through the inner circulation air port 107 and the air flowing through the outer circulation air port 108, and the mixed proportion may be controlled via the circulation air door 106 according to the requirements for comfortableness of the air conditioning system.

Figure 7:
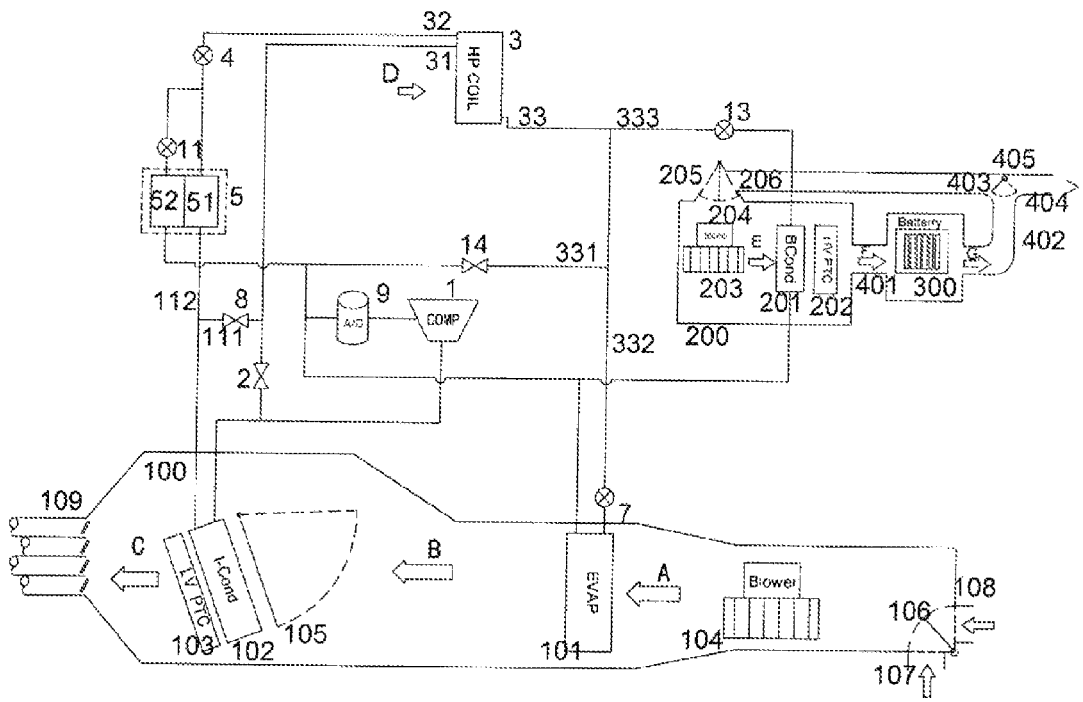
FIG. 7 is a schematic view showing the pipe connection of the automotive air conditioning system according to another embodiment of the present application.
Figure 8:
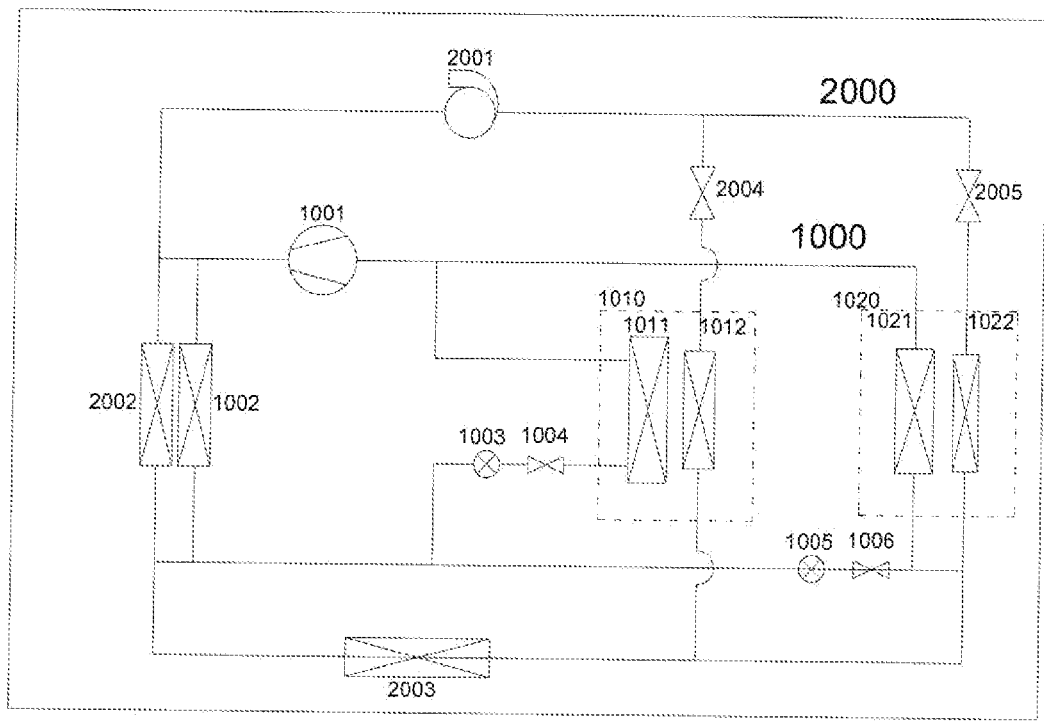
FIG. 8 is schematic view showing the pipe connection of a typical automotive air conditioning system.

The throttling device described in the above embodiments may employ a thermal expansion valve, an electronic expansion valve, or a switching type electronic expansion valve or a throttling pipe which has a small caliber size, and the electronic expansion valve is preferably employed. Another embodiment of the automotive air conditioning is described as follows. Reference is made to FIG. 7. FIG. 7 is a schematic view showing the pipe connection of the automotive air conditioning according to another embodiment of the present application. A main difference of this embodiment from the embodiments in FIGS. 4, 5 and 6 is that, the second throttling device 7, the third throttling device 11, and the fourth throttling device 13 may employ the electronic expansion valve having a closing function, thus the corresponding second stop valve 6, the fourth stop valve 10 and the fifth stop valve 12 in the pipelines of the second throttling device 7 may be removed. Therefore the number of the stop valves may be decreased, which enables the air conditioning system to be simple. Further, the stop valves described above specifically may use a mechanical stop valve, or an electrical stop valve such as an electrically operated valve, which is not limited here. In addition, the stop valve for controlling the flow passage may also be replaced by other three way control valves. In the present application, besides the outdoor heat exchanger, other heat exchangers may also employ the micro-channel heat exchanger, for example, the first heat exchanger and the battery heat exchanger may employ the micro-channel heat exchanger, thus a volume of the an conditioning system may be decreased, and the heat exchanging efficiency is further improved. Sequence numbers in the above specification are only for clarity and easy discrimination in description, and these should not be regarded as a limitation to the present application. In addition, the outdoor heat exchanger in the above embodiments may employ a structure of an individual micro-channel heat exchanger, and may also employ a structure of two parallel micro-channel heat exchangers, for example a pipeline is separated into two branches to the above two micro-channel heat exchangers. The two micro-channel heat exchangers may use one distribution pipe, and one manifold in common, which can be implemented by using a partition plate to separate the distribution pipe and the manifold respectively, and this simply make the structure more complicated.

The embodiments described hereinabove are only example embodiments of the present application. It should lie noted that, for the person skilled in the art, a few of modifications and improvements may be made to the present application without departing from the principle of the present application. The scope of the present application is defined by the claims.

What is claimed is:

1. An air conditioning system, comprising a refrigerating mode and a heating mode, wherein the air conditioning system comprises a compressor, and an outdoor heat exchanger for exchanging heat with an ambient environment, and the air conditioning system further comprises a first heat exchanger, a second heat exchanger, and at least two throttling devices, the throttling devices comprise a first throttling device and a second throttling device; the outdoor heat exchanger is a micro-channel heat exchanger, which comprises a first inlet, a second inlet, an outlet, a distribution pipe, a manifold, a plurality of flat tubes for communicating the distribution pipe with the manifold, fins fixed between the plurality of flat tubes, and a distributor located in the distribution pipe to distribute a working medium, and the distributor is provided with distribution holes, and the distribution holes are in communication with a distribution cavity of the distribution pipe; the first inlet of the outdoor heat exchanger is in communication with the distribution cavity of the distribution pipe directly, while the second inlet of the outdoor heat exchanger is in communication with the distribution cavity via the distribution holes in the distributor; the outlet of the outdoor heat exchanger is in communication with the manifold; in the refrigerating mode, the working medium at gaseous enters the distribution pipe of the outdoor heat exchanger via the first inlet of the outdoor heat exchanger or via the first inlet and the second inlet of the outdoor heat exchanger; and in the heating mode, the working medium enters the distribution pipe of the outdoor heat exchanger via the second inlet of the outdoor heat exchanger.

2. The air conditioning system according to claim 1, wherein the first throttling device is arranged between the second inlet of the outdoor heat exchanger and the second heat exchanger, the second throttling device is arranged upstream of the first heat exchanger, and the first throttling device is connected to the second inlet of the outdoor heat exchanger directly or via pipelines; an outlet of the compressor is communicated to an inlet of the second heat exchanger via pipelines, or is communicated to the first inlet of the outdoor heat exchanger, or is communicated to the first inlet of the outdoor heat exchanger via the second heat exchanger; an inlet of the compressor is communicated to an outlet of the first heat exchanger or the outlet of the outdoor heat exchanger via pipelines.

3. The air conditioning system according to claim 2, wherein a pipeline coming out of the outlet of the outdoor heat exchanger is divided into at least two branches, a first branch of at least two branches is connected to the inlet of the compressor via control valves and pipelines; a second branch of at least two branches is connected to an inlet of the first heat exchanger via the second throttling device or the second throttling device and the control valves and pipelines; the outlet of the first heat exchanger is communicated to the inlet of the compressor via pipelines positions of the first inlet, the second inlet of the outdoor heat exchanger are higher than a position of the outlet of the outdoor heat exchanger, and when the outdoor heat exchanger is arranged, a position where the distribution pipe is located, is higher than a position where the distribution pipe is located.

4. The air conditioning system according to claim 3, wherein the air conditioning system further includes an intermediate heat exchanger, which is a dual channel heat exchanger and comprises a first heat exchanging unit and a second heat exchanging unit that are isolated from each other but capable of exchanging heat with each other, an inlet of the first heat exchanging unit is connected to an outlet pipeline of the second heat exchanger, and an outlet of the first heat exchanging unit is connected to the second inlet of the outdoor heat exchanger via the first throttling device and pipelines; an inlet of the second heat exchanging unit is connected to the outlet of the first heat exchanging unit via a third throttling device, and an outlet of the second heat exchanging unit is connected to the inlet of the compressor via pipelines; in the heating mode, the working medium of the second heat exchanging unit is throttled by the third throttling device, and the first heat exchanging unit exchanges heat with the throttled working medium, which decreases a temperature of the working medium passing through the first heat exchanging unit.

5. The air conditioning system according to claim 3, wherein the air conditioning system is an air conditioning system for an electric automobile or a hybrid automobile, the air conditioning system further comprises a battery heat exchanger for providing cold energy to a battery, and a fourth throttling device arranged upstream of the battery heat exchanger, the fourth throttling device has one end connected to the outlet of the outdoor heat exchanger via pipelines, and an outlet of the battery heat exchanger is connected to the inlet of the compressor via pipelines.

6. The air conditioning system according to claim 5, wherein in the case that the air conditioning system is in the refrigerating mode, after the working medium at high-temperature and high-pressure being cooled by the outdoor heat exchanger, the working medium coming out of the outlet of the outdoor heat exchanger is divided into two branches: the working medium in one branch is throttled by the second throttling device and flows to the first heat exchanger after a temperature and a pressure of the working medium are decreased; the working medium in another branch flows to the battery heat exchanger to cool the battery after being throttled by the fourth throttling device; outlet pipelines of the first heat exchanger and the battery heat exchanger are connected and joined together and then is connected to a pipeline of the compressor, or is connected to the compressor via a gas-liquid separator and pipelines.

7. The air conditioning system according to claim 2, wherein the air conditioning system further includes an intermediate heat exchanger, which is a dual channel heat exchanger and comprises a first heat exchanging unit and a second heat exchanging unit that are isolated from each other but capable of exchanging heat with each other, an inlet of the first heat exchanging unit is connected to an outlet pipeline of the second heat exchanger, and an outlet of the first heat exchanging unit is connected to the second inlet of the outdoor heat exchanger via the first throttling device and pipelines; an inlet of the second heat exchanging unit is connected to the outlet of the first heat exchanging unit via a third throttling device, and an outlet of the second heat exchanging unit is connected to the inlet of the compressor via pipelines; in the heating mode, the working medium of the second heat exchanging unit is throttled by the third throttling device, and the first heat exchanging unit exchanges heat with the throttled working medium, which decreases a temperature of the working medium passing through the first heat exchanging unit.

8. The air conditioning system according to claim 2, wherein the air conditioning system is an air conditioning system for an electric automobile or a hybrid automobile, the air conditioning system further comprises a battery heat exchanger for providing cold energy to a battery, and a fourth throttling device arranged upstream of the battery heat exchanger; the fourth throttling device has one end connected to the outlet of the outdoor heat exchanger via pipelines, and an outlet of the battery heat exchanger is connected to the inlet of the compressor via pipelines.

9. The air conditioning system according to claim 8, wherein in the case that the air conditioning system is in the refrigerating mode, after the working medium at high-temperature and high-pressure being cooled by the outdoor heat exchanger, the working medium coming out of the outlet of the outdoor heat exchanger is divided into two branches: the working medium in one branch is throttled by the second throttling device and flows to the first heat exchanger after a temperature and a pressure of the working medium are decreased; the working medium in another branch flows to the battery heat exchanger to cool the battery after being throttled by the fourth throttling device; outlet pipelines of the first heat exchanger and the battery heat exchanger are connected and joined together and then is connected to a pipeline of the compressor, or is connected to the compressor via a gas-liquid separator and pipelines.

10. The air conditioning system according to claim 8, wherein in the case that the air conditioning system is in the heating mode, after the working medium at low-temperature and low-pressure passing through the outdoor heat exchanger, one part of the working medium coming out of the outlet of the outdoor heat exchanger returns to the compressor by passing through the pipelines or a gas-liquid separator and pipelines, and another part selectively communicates with the battery heat exchanger for providing the cold energy to the battery.

11. The air conditioning system according to claim 1, wherein the air conditioning system further includes an intermediate heat exchanger, which is a dual channel heat exchanger and comprises a first heat exchanging unit and a second heat exchanging unit that are isolated from each other but capable of exchanging heat with each other, an inlet of the first heat exchanging unit is connected to an outlet pipeline of the second heat exchanger, and an outlet of the first heat exchanging unit is connected to the second inlet of the outdoor heat exchanger via the first throttling device and pipelines; an inlet of the second heat exchanging unit is connected to the outlet of the first heat exchanging unit via a third throttling device, and an outlet of the second heat exchanging unit is connected to the inlet of the compressor via pipelines; in the heating mode, the working medium of the second heat exchanging unit is throttled by the third throttling device, and the first heat exchanging unit exchanges heat with the throttled working medium, which decreases a temperature of an operating medium passing through the first heat exchanging unit.

12. The air conditioning system according to claim 11, wherein the air conditioning system is an air conditioning system for an electric automobile or a hybrid automobile, the air conditioning system further comprises a battery heat exchanger for providing cold energy to a battery, and a fourth throttling device arranged upstream of the battery heat exchanger; the fourth throttling device has one end connected to the outlet of the outdoor heat exchanger via pipelines, and an outlet of the battery heat exchanger is connected to the inlet of the compressor via pipelines.

13. The air conditioning system according to claim 12, wherein in the case that the air conditioning system is in the refrigerating mode, after the working medium at high-temperature and high-pressure being cooled by the outdoor heat exchanger, the working medium coming out of the outlet of the outdoor heat exchanger is divided into two branches: the working medium in one branch is throttled by the second throttling device and flows to the first heat exchanger after a temperature and a pressure of the working medium are decreased; the working medium in another branch flows to the battery heat exchanger to cool the battery after being throttled by the fourth throttling device; outlet pipelines of the first heat exchanger and the battery heat exchanger are connected and joined together and then is connected to a pipeline of the compressor, or is connected to the compressor a gas-liquid separator and pipelines.

14. The air conditioning system according to claim 1, wherein the air conditioning system is an air conditioning system for an electric automobile or a hybrid automobile, the air conditioning system further comprises a battery heat exchanger for providing cold energy to a battery, and a fourth throttling device arranged upstream of the battery heat exchanger; the fourth throttling device has one end connected to the outlet of the outdoor heat exchanger via pipelines, and an outlet of the battery heat exchanger is connected to the inlet of the compressor via pipelines.

15. The air conditioning system according to claim 14, wherein in the case that the air conditioning system is in the refrigerating mode, after the working medium at high-temperature and high-pressure being cooled by the outdoor heat exchanger, the working medium coming out of the outlet of the outdoor heat exchanger is divided into two branches: the working medium in one branch is throttled by the second throttling device and flows to the first heat exchanger after a temperature and a pressure of the working medium are decreased; the working medium in another branch flows to the battery heat exchanger to cool the battery after being throttled by the fourth throttling device; outlet pipelines of the first heat exchanger and the battery heat exchanger are connected and joined together and then is connected to a pipeline of the compressor, or is connected to the compressor via a gas-liquid separator and pipelines.

16. The air conditioning system according to claim 14, wherein in the case that the air conditioning system is in the heating mode, after the working medium at a low-temperature and low-pressure passing through the outdoor heat exchanger, one part of the working medium coming out of the outlet of the outdoor heat exchanger returns to the compressor by passing through the pipelines or a gas-liquid separator and pipelines, and another part selectively communicates with the battery heat exchanger for providing the cold energy to the battery.

17. The air conditioning system according to claim 14, wherein the air conditioning system further comprises a defrosting mode and a dehumidifying mode, in the defrosting mode, the first inlet of the outdoor heat exchanger is connected to the pipeline coming from the outlet of the compressor, the outlet of the outdoor heat exchanger is connected to the inlet of the compressor via pipelines, and the working medium at a high-temperature and high-pressure gaseous enters the outdoor heat exchanger via the first inlet of the outdoor heat exchanger, and releases heat to realize the defrosting; in the dehumidifying mode, the working medium coming from the outlet of the compressor firstly passes through the second heat exchanger, returns to the outdoor heat exchanger, and then flows to the first heat exchanger after being throttled via the second throttling device; the air blowing into an interior firstly is cooled down and dehumidified via the first heat exchanger, and then is heated and dehumidified via the second heat exchanger.

18. A heat exchanger, wherein the heat exchanger is a micro-channel heat exchanger, comprising a distribution pipe, a manifold, a plurality of flat tubes configured to communicate the distribution pipe with the manifold, fins fixed between the plurality of flat tubes, a distributor located in the distribution pipe to distribute a working medium, a first inlet and a second inlet in communication with the distribution pipe, and an outlet in communication with the manifold; the distributor is provided with distribution holes, and the distribution holes are in communication with a distribution cavity of the distribution pipe; the first inlet of the outdoor heat exchanger is in communication with the distribution cavity of the distribution pipe directly, while the second inlet of the outdoor heat exchanger is in communication with the distribution cavity via the distribution holes in the distributor; wherein a partition plate is not provided in the distribution cavity of the distribution pipe to separate the distribution cavity which is in communication with the first inlet and the second inlet, and the manifold in communication with the outlet of the micro-channel heat exchanger is also not provided with a partition plate to separate an inner cavity of the manifold.

19. The heat exchanger according to claim 18, wherein the distribution pipe comprises a pipe body, and end caps at end portions, and the pipe body and the end caps are fixed by welding; the second inlet is arranged in a second connecting pipe, and the second connecting pipe is fixed to the end caps by welding; a connecting pipe where the first inlet is located is fixed to the end cap, the pipe body, or an end portion of another end of the distribution pipe by welding; and a circulation area of the first inlet is greater than or equal to a circulation area of the second inlet, and a length of the connecting pipe, where the second inlet is located, extending into the distribution cavity, is greater than a length of the connecting pipe, where the first inlet is located, extending into the distribution cavity.

20. The heat exchanger according to claim 18, wherein the heat exchanger is the outdoor heat exchanger used in the heat pump type air conditioning system; in the case that the air conditioning system operates in the refrigerating mode, the working medium enters the distribution cavity of the distribution pipe of the outdoor heat exchanger via the first inlet or the first inlet and the second inlet; in the case that the air conditioning system operates in the heating mode, the working medium enters the distribution cavity of the distribution pipe of the outdoor heat exchanger via the second inlet; and positions of the first inlet and the second inlet of the heat exchanger are both higher than a position of the outlet of the outdoor heat exchanger, and a position where the distribution pipe is located when the heat exchanger is mounted is higher than a position where the manifold is located.

* * * * *